US012630755B2

(12) United States Patent
Kataishi

(10) Patent No.: US 12,630,755 B2
(45) Date of Patent: May 19, 2026

(54) THERMALLY CONDUCTIVE GREASE COMPOSITION

(71) Applicant: Fuji Polymer Industries Co., Ltd., Nagoya (JP)

(72) Inventor: Takumi Kataishi, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 537 days.

(21) Appl. No.: 18/251,476

(22) PCT Filed: Nov. 2, 2021

(86) PCT No.: PCT/JP2021/040400

§ 371 (c)(1),
(2) Date: May 2, 2023

(87) PCT Pub. No.: WO2022/215292

PCT Pub. Date: Oct. 13, 2022

(65) Prior Publication Data

US 2024/0018405 A1      Jan. 18, 2024

(30) Foreign Application Priority Data

Apr. 8, 2021      (JP) ................................. 2021-065981

(51) Int. Cl.

| | |
|---|---|
| *C09K 5/14* | (2006.01) |
| *C08F 210/16* | (2006.01) |
| *C08K 13/06* | (2006.01) |
| *C08K 3/38* | (2006.01) |
| *C08K 7/00* | (2006.01) |
| *C08K 9/06* | (2006.01) |

(52) U.S. Cl.
CPC .............. *C09K 5/14* (2013.01); *C08F 210/16* (2013.01); *C08K 13/06* (2013.01); *C08K 2003/385* (2013.01); *C08K 7/00* (2013.01); *C08K 9/06* (2013.01); *C08K 2201/001* (2013.01); *C08K 2201/005* (2013.01)

(58) Field of Classification Search
CPC ......... C08F 210/16; C08K 13/06; C08K 9/06; C08K 7/00; C08K 2003/2227; C08K 2003/385; C08K 2201/0001; C08K 2201/014; C08K 2201/005; C09K 5/14; C08L 23/0815; C10M 169/06; C10M 169/02; C10M 171/06; C10M 113/16; C10M 2201/061; C10M 2201/05; C10M 2229/0415; C10M 2205/022; C10M 2205/0225; C10M 2205/0285; C10N 2030/02; C10N 2030/38; C10N 2020/02; C10N 2020/06; C10N 2020/017; C10N 2050/10; C10N 2010/06
USPC ............................................... 252/74, 73, 71
See application file for complete search history.

(56) References Cited

U.S. PATENT DOCUMENTS

| | | | |
|---|---|---|---|
| 2004/0057206 A1 | 3/2004 | Tomaru et al. | |
| 2017/0226396 A1* | 8/2017 | Yang ......................... | C08K 3/28 |
| 2021/0147738 A1 | 5/2021 | Takanashi et al. | |

FOREIGN PATENT DOCUMENTS

| | | |
|---|---|---|
| JP | 2002-305271 | 10/2002 |
| JP | 2002-329989 | 11/2002 |
| JP | 2002-353673 | 12/2002 |
| JP | 2006-188638 | 7/2006 |
| JP | 2010-077220 | 4/2010 |
| JP | 2016-044213 | 4/2016 |
| JP | 2017-190389 | 10/2017 |
| JP | 2017-530220 | 10/2017 |
| JP | 2018-104714 | 7/2018 |
| WO | 2019/189182 | 4/2021 |

OTHER PUBLICATIONS

International Search Report issued in International Application No. PCT/JP2021/040400, Jan. 18, 2022, 5 pages w/translation.

* cited by examiner

*Primary Examiner* — Jessica Whiteley
(74) *Attorney, Agent, or Firm* — HSML P.C.

(57) ABSTRACT

A non-curable thermally conductive grease composition includes: A. 100 parts by mass of an ethylene-$\alpha$-olefin copolymer with a kinematic viscosity of 10000 mm$^2$/s or less at 40° C.; and B. 115 to 580 parts by mass of thermally conductive particles with respect to 100 parts by mass of the component A. The thermally conductive particles contain the following: B1. 55 to 350 parts by mass of irregularly-shaped alumina with a median particle size of 0.1 to 1 μm, in which a part or all of the alumina is surface treated with a specific alkoxysilane compound or its partial hydrolysate; B2. 5 to 60 parts by mass of plate-shaped boron nitride with a median particle size of 0.1 to 10 μm; and B3. 55 to 170 parts by mass of aggregated boron nitride with a median particle size of 20 to 70 μm. The B3/B2 mass ratio is 2 to 20. Thus, the thermally conductive grease composition is less likely to generate low molecular siloxane and has high drop resistance and a low specific gravity.

9 Claims, 2 Drawing Sheets

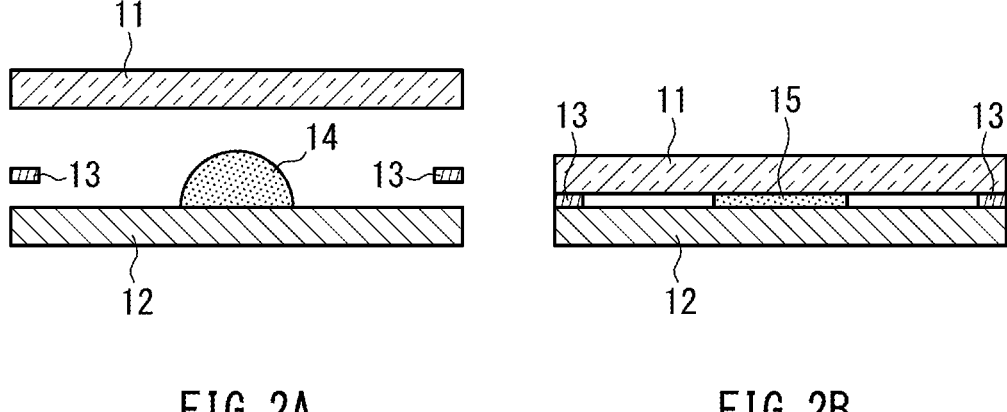
FIG. 2A                    FIG. 2B
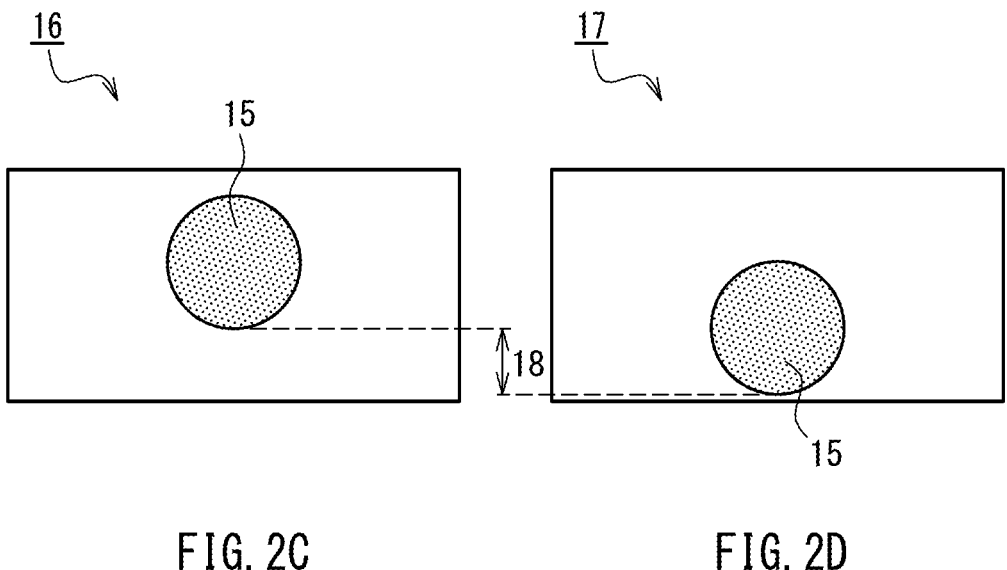
FIG. 2C                    FIG. 2D

THERMALLY CONDUCTIVE GREASE COMPOSITION

TECHNICAL FIELD

The present invention relates to a thermally conductive grease composition that is suitable to be interposed between a heat generating member and a heat dissipating material of electrical and electronic components or the like.

BACKGROUND ART

With the significant improvement in the performance of semiconductor devices such as CPUs in recent years, the amount of heat generated by them has become extremely large. For this reason, heat dissipating materials are attached to electronic components that may generate heat, and a thermally conductive grease is used to improve the adhesion between the heat dissipating materials and heat generating members such as semiconductor devices. The thermally conductive grease has been required to have high thermal conductive properties and drop resistance as devices become smaller in size, more sophisticated, and more highly integrated. Patent Document 1 proposes a composition that includes a thermally conductive filler, a polyorganosiloxane resin containing at least one polysiloxane having one curable functional group in the molecule, and a siloxane compound having an alkoxysilyl group and a linear siloxane structure. Patent Document 2 proposes a thermally conductive silicone composition that includes a liquid silicone, a thermally conductive filler, and hydrophobic spherical silica fine particles, and that has high heat dissipation properties. Patent Document 3 proposes a fluorine-containing adhesive composition that includes alumina with different particle sizes and shapes (see paragraph [0131]).

PRIOR ART DOCUMENTS

Patent Documents

Patent Document 1: JP 2018-104714A
Patent Document 2: JP 2016-044213A
Patent Document 3: JP 2017-190389A

DISCLOSURE OF INVENTION

Problem to be Solved by the Invention

However, the conventional thermally conductive silicone grease may cause an electrical contact failure due to the generation of low molecular siloxane. Moreover, the conventional thermally conductive silicone grease has low drop resistance and a high specific gravity.

To solve the above conventional problems, the present invention provides a thermally conductive grease composition that is less likely to generate low molecular siloxane and has high drop resistance and a low specific gravity.

Means for Solving Problem

A thermally conductive grease composition of the present invention is a non-curable thermally conductive grease composition and includes: A. 100 parts by mass of an ethylene-α-olefin copolymer with a kinematic viscosity of 10000 mm²/s or less at 40° C.; and B. 115 to 580 parts by mass of thermally conductive particles with respect to 100 parts by mass of the component A. The thermally conductive particles contain the following: B1. 55 to 350 parts by mass of irregularly-shaped alumina with a median particle size of 0.1 to 1 μm, in which a part or all of the alumina is surface treated with an alkoxysilane compound expressed by $R_a Si(OR')_{4-a}$ (where R represents a substituted or unsubstituted organic group having 8 to 12 carbon atoms, R' represents an alkyl group having 1 to 4 carbon atoms, and a represents 0 or 1) or a partial hydrolysate of the alkoxysilane compound; B2. 5 to 60 parts by mass of plate-shaped boron nitride with a median particle size of 0.1 to 10 μm; and B3. 55 to 170 parts by mass of aggregated boron nitride with a median particle size of 20 to 70 μm. A mass ratio (B3/B2) of the component B3 to the component B2 is 2 to 20.

Effects of the Invention

The thermally conductive grease composition of the present invention includes the ethylene-α-olefin copolymer as a matrix resin, and thus is less likely to generate low molecular siloxane. Moreover, since the irregularly-shaped alumina, the plate-shaped boron nitride, and the aggregated boron nitride, each of which has a specific particle size, are combined and mixed together, the thermally conductive grease composition has high drop resistance and a low specific gravity.

BRIEF DESCRIPTION OF DRAWINGS

FIGS. 2A to 2D are schematic diagrams illustrating a drop test used in an example of the present invention.

DESCRIPTION OF THE INVENTION

Figure 1A:
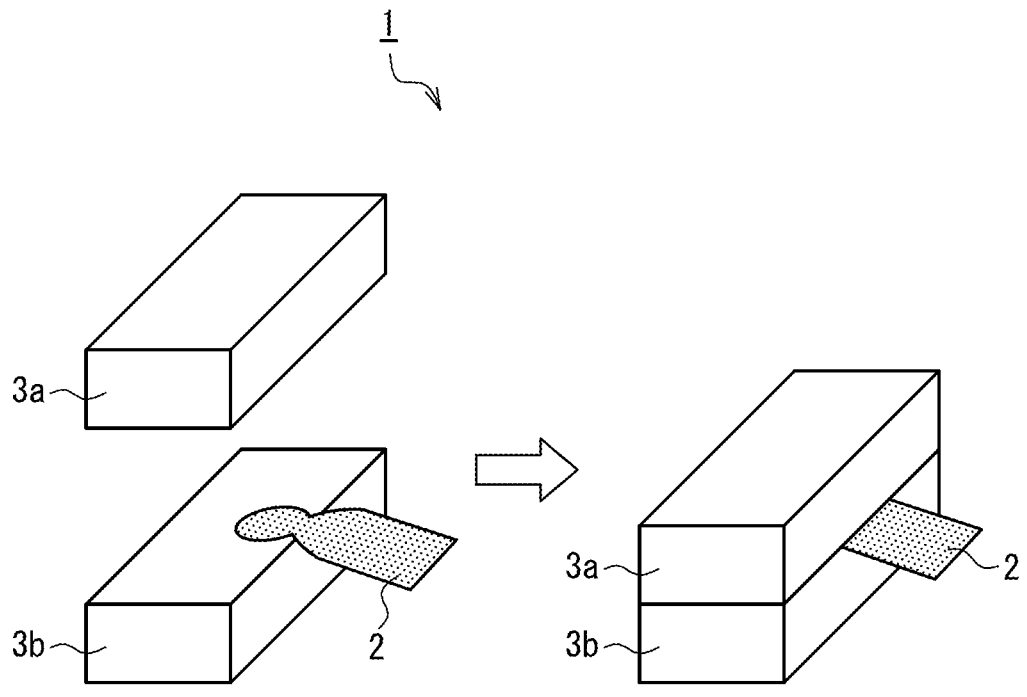
FIGS. 1A to 1B are diagrams illustrating a method for measuring a thermal conductivity of a sample in an example of the present invention.

The thermally conductive grease composition of the present invention is a non-curable thermally conductive grease composition. Therefore, a curing catalyst and a curing agent are not necessary, but may be added in some cases. The ethylene-α-olefin copolymer with a kinematic viscosity of 10000 mm²/s or less at 40° C. serves as a matrix resin. The use of the ethylene-α-olefin copolymer as a base polymer can reduce the generation of low molecular siloxane in the thermally conductive grease composition of the present invention. The kinematic viscosity of the ethylene-α-olefin copolymer is preferably 50 to 10000 mm²/s, and more preferably 100 to 8000 mm²/s at 40° C. The ethylene-α-olefin copolymer may be, e.g., an ethylene-propylene copolymer. The ethylene-propylene copolymer is a hydrocarbon-based synthetic oil that does not contain a polar group, and is commercially available as the "LUCANT (trade name)" series manufactured by Mitsui Chemicals, Inc. The ethylene-propylene copolymer has a specific gravity of 0.83 to 0.85 (a density of 0.83 to 0.85 g/cm 3), which is advantageous in reducing the specific gravity of the composition.

The component A and the component B, and optionally other components, are mixed in the following proportions to form a grease.

A. 100 parts by mass of the ethylene-α-olefin copolymer with a kinematic viscosity of 10000 mm²/s or less at 40° C.

B. 115 to 580 parts by mass of the thermally conductive particles with respect to 100 parts by mass of the component A. The amount of the component B is preferably 130 to 550 parts by mass, and more preferably 160 to 500 parts by mass.

The thermally conductive particles contain the following:

B1. 55 to 350 parts by mass of irregularly-shaped alumina with a median particle size of 0.1 to 1 μm, in which a part or all of the alumina is surface treated with an alkoxysilane compound expressed by $R_aSi(OR')_{4-a}$ (where R represents a substituted or unsubstituted organic group having 8 to 12 carbon atoms, R' represents an alkyl group having 1 to 4 carbon atoms, and a represents 0 or 1) or a partial hydrolysate of the alkoxysilane compound;

B2. 5 to 60 parts by mass of plate-shaped boron nitride with a median particle size of 0.1 to 10 μm; and B3. 55 to 170 parts by mass of aggregated boron nitride with a median particle size of 20 to 70 μm. The mixing ratio (B3/B2) of the component B3 to the component B2 is 2 to 20.

In this case, the term "part" of the alumina means 50% by mass or more.

The thermally conductive grease composition preferably further includes 0.1 to 2 parts by mass of an alkoxysilane compound expressed by $R_aSi(OR')_{4-a}$ (where R represents a substituted or unsubstituted organic group having 8 to 12 carbon atoms, R' represents an alkyl group having 1 to 4 carbon atoms, and a represents 0 or 1) as a component C (viscosity modifier). This can reduce the viscosity of the composition.

The thermal conductivity of the thermally conductive grease composition is preferably 2.0 W/m·K or more and 8.0 W/m·K or less, more preferably 2.5 to 8.0 W/m·K, and further preferably 3.0 to 8.0 W/m-K. This thermally conductive grease composition is suitable as a TIM (thermal interface material).

The specific gravity of the thermally conductive grease composition is preferably 1.0 or more and 2.4 or less, more preferably 1.1 to 2.3, and further preferably 1.2 to 2.2. The thermally conductive grease composition with such a low specific gravity can help to reduce the weight of the overall electronic components.

The absolute viscosity of the thermally conductive grease composition is preferably 1000 to 20000 Pas, more preferably 1000 to 18000 Pas, and further preferably 1000 to 15000 Pas at 23° C., which is measured with a B-type viscometer using a T-E spindle at a rotational speed of 5 rpm. This can improve the workability of the thermally conductive grease composition, and can also facilitate the insertion or application of the thermally conductive grease composition between the heat generating member and the heat dissipating material.

In the present invention, the reason that the components B1, B2, and B3 are mixed with the component A in the above proportions is to allow small-size particles to fill the space between large-size particles so that closest packing can be approximated to enhance the thermal conductive properties. The parade size may be measured with a laser diffraction scattering method to determine D50 (median diameter) in a volume-based cumulative particle size distribution. The method may use, e.g., a laser diffraction/scattering particle size distribution analyzer LA-950 S2 manufactured by HORIBA, Ltd.

A part or all of the irregularly-shaped alumina with a median parade size of 0.1 to 1 μm is surface treated with an alkoxysilane compound expressed by $R_aSi(OR')_{4-a}$ (where R represents a substituted or unsubstituted organic group having 8 to 12 carbon atoms, R' represents an alkyl group having 1 to 4 carbon atoms, and a represents 0 or 1) or a partial hydrolysate of the alkoxysilane compound. Examples of the alkoxysilane compound include octyltrimethoxysilane, octyltriethoxysilane, decyltrimethoxysilane, decyltriethoxysilane, dodecyltrimethoxysilane, and dodecyltriethoxysilane. These silane compounds may be used alone or in combination of two or more. The alkoxysilane and one-end silanol siloxane may be used together as a surface treatment agent. In this case, the surface treatment may include adsorption in addition to a covalent bond. The surface treatment improves the mixability of the thermally conductive particles with the matrix resin.

The thermally conductive particles are preferably pretreated with the alkoxysilane compound. It is preferable that 0.01 to 10 parts by mass of the alkoxysilane compound is added to 100 parts by mass of the thermally conductive particles. The surface treatment facilitates the filling of the thermally conductive particles into the matrix resin.

The irregularly-shaped alumina is produced by pulverization or crushing and may be selected from commercially available products.

The dropping of the thermally conductive grease composition is preferably 5 mm or less, which is determined by a thermal shock test. In the thermal shock test, 0.4 g of the thermally conductive grease composition is sandwiched between two plates and compressed to a thickness of 0.5 mm. Then, the two plates are held upright and placed in a thermal shock tester, where the compressed thermally conductive grease composition is subjected to 100 cycles of thermal shock at −40° C. for 30 minutes and 125° C. for 30 minutes. The results confirm that the thermally conductive grease composition can maintain high drop resistance.

The thermally conductive grease composition of the present invention may include components other than the above as needed. For example, a heat resistance improver (such as colcothar, titanium oxide, or cerium oxide), a flame retardant, and a flame retardant auxiliary may be added. Moreover, an organic or inorganic particle pigment may be added for the purpose of coloring and toning. An alkoxy group-containing silicone may be added as a material used for, e.g., the surface treatment of a filler.

The thermally conductive grease composition of the present invention may be present in, e.g., a dispenser, a bottle, a can, or a tube and offered as a commercial product.

EXAMPLES

Hereinafter, the present invention will be described by way of examples. However, the present invention is not limited to the following examples. Various parameters were measured in the following manner.

<Thermal Conductivity>

Figure 1B:
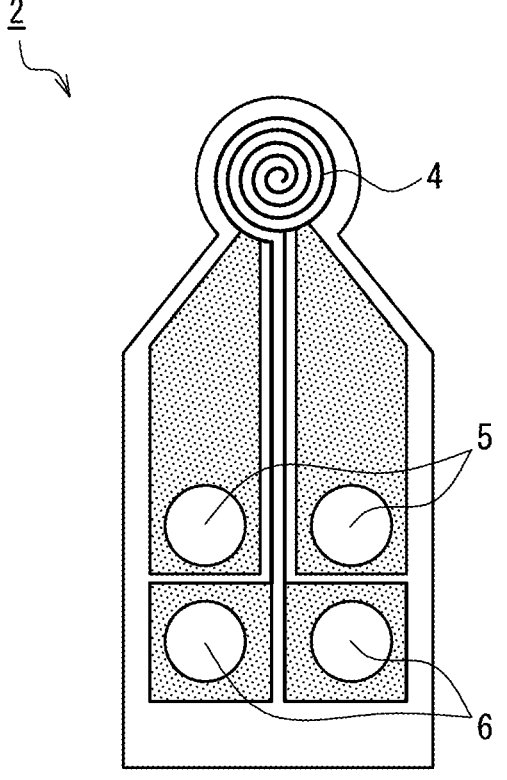

The thermal conductivity of a thermally conductive grease was measured by a hot disk (in accordance with ISO/CD 22007-2). As shown in FIG. 1A, using a thermal conductivity measuring apparatus 1, a polyimide film sensor 2 was sandwiched between two samples 3a, 3b, and constant power was applied to the sensor 2 to generate a certain amount of heat. Then, the thermal characteristics were analyzed from the value of a temperature rise of the sensor 2. The sensor 2 has a tip 4 with a diameter of 7 mm. As shown in FIG. 1B, the tip 4 has a double spiral structure of electrodes. Moreover, an electrode 5 for an applied current and an electrode 6 for a resistance value (temperature measurement electrode) are located on the lower portion of the sensor 2. The thermal conductivity was calculated by the following formula (1)

$$\lambda = \frac{P_0 \cdot D(\tau)}{\pi^{3/2} \cdot r} \cdot \frac{D(\tau)}{\Delta T(\tau)} \qquad \text{[Formula 1]}$$

λ: Thermal conductivity (W/m·K)
$P_0$: Constant power (W)
r: Radius of sensor (m)
τ: $\sqrt{\alpha \cdot t / r^2}$
α: Thermal diffusivity of sample (m²/s)
t: Measuring time (s)
D(τ): Dimensionless function of τ
ΔT(τ): Temperature rise of sensor (K)

<Absolute Viscosity of Grease>

The absolute viscosity of a thermally conductive grease was measured with a B-type viscometer (Brookfield HB DV2T). The B-type viscometer used a T-E spindle to measure the absolute viscosity at a rotational speed of 5 rpm and 23° C.

<Drop Test>

A thermally conductive grease was measured by a drop test as shown in FIGS. 2A to 2D.

First, 0.4 g of a thermally conductive grease 14 was applied between an aluminum plate 12 of 40 mm long, 100 mm wide, and 5 mm thick and a glass plate 11 of 40 mm long, 100 mm wide, and 5 mm thick (FIG. 2A). Then, the thermally conductive grease 14 was compressed to a thickness of 0.5 mm with spacers 13 inserted between the glass plate 11 and the aluminum plate 12 (FIG. 2B). In FIG. 2B, reference numeral 15 represents the compressed thermally conductive grease having a thickness of 0.5 mm. Next, this sample was placed in a thermal cycle tester so that the space between the glass plate 11 and the aluminum plate 12 was held vertically (FIG. 2C). Reference numeral 16 represents a test piece before the drop test. In this state, the compressed thermally conductive grease 15 was subjected to a thermal cycle test at −40° C. for 30 minutes and 125° C. for 30 minutes in each cycle. After 100 cycles were completed, the sample was taken out and observed whether the compressed thermally conductive grease 15 dropped down or not. Reference numeral 17 represents the test piece after the drop test (FIG. 2D), and reference numeral 18 represents a dropping distance. The thermally conductive grease was graded A when the dropping distance was 5 mm or less and graded B when the dropping distance was more than 5 mm.

Examples 1 to 2 and Comparative Examples 1 to 2

1. Material Components
(1) Component A: Ethylene-Propylene Copolymer
Ethylene-propylene copolymer with a kinematic viscosity of 400 mm²/s at 40° C., "LUCANT LX004 (trade name)" manufactured by Mitsui Chemicals, Inc.
Non-curable silicone oil (dimethylpolysiloxane) with a kinematic viscosity of 110 mm²/s at 40° C.
These materials were used in the proportions as shown in Table 1.
(2) Component B: Thermally Conductive Particles
Irregularly-shaped alumina with a median particle size of 0.3 μm (D50=0.3 μm): a material pretreated with octyltrimethoxysilane (in which 2.4 g of octyltrimethoxysilane was adsorbed on 100 g of alumina)
Plate-shaped boron nitride with a median particle size of 5 μm (D50=5 μm) (without surface treatment)
Aggregated spherical boron nitride with a median particle size of 60 μm (D50=60 μm) (without surface treatment)
Irregularly-shaped alumina with a median particle size of 2.3 μm (D50=2.3): a material pretreated with decyltrimethoxysilane (in which 1.1 g of decyltrimethoxysilane was adsorbed on 100 g of alumina)
Spherical alumina with a median particle size of 20 μm (D50=20 μm) (without surface treatment)
Table 1 shows the amount of each type of the thermally conductive particles added.
(3) Component C: Viscosity Modifier
decyltrimethoxysilane
2. Mixing Method
The component A was mixed with the thermally conductive particles and the viscosity modifier to form a thermally conductive grease composition.
The thermally conductive grease composition thus obtained was evaluated. Table 1 shows the conditions and the results.

TABLE 1

| Component | | Ex. 1 | Ex. 2 | Comp. Ex. 1 | Comp. Ex. 2 |
|---|---|---|---|---|---|
| A | Ethylene-propylene copolymer, kinematic viscosity: 400 mm²/s (g) | 100 | 100 | — | 100 |
| | Silicone oil, kinematic viscosity: 110 mm²/s (g) | — | — | 100 | — |
| B1 | Irregularly-shaped alumina, D50 = 0.3 μm, surface treated material (g) | 180 | 207 | 180 | 50 |
| B2 | Plate-shaped boron nitride, D50 = 5 μm (g) | 20 | 23 | 20 | — |
| B3 | Aggregated spherical boron nitride, D50 = 60 μm (g) | 86 | 99 | 86 | — |
| | Irregularly-shaped alumina, D50 = 2.3 μm, surface-treated material (g) | — | — | — | 650 |
| | Spherical alumina, D50 = 20 μm (g) | — | — | — | 550 |
| C | Decyltrimethoxysilane (g) | 0.8 | 0.8 | 0.8 | — |
| B3/B2 mass ratio | | 4.3 | 4.3 | 4.3 | — |
| Absolute viscosity (Pas, B-type viscometer) | | 5000 | 12000 | 3500 | 1300 |
| Thermal conductivity (W/m · K), hot disk method | | 3.7 | 5.5 | 5.1 | 2.6 |
| Drop test (thermal shock, 100 h) | | A | A | B | B |
| Specific gravity | | 1.66 | 1.84 | 1.92 | 3.10 |

The results confirmed that the thermally conductive grease compositions of Examples 1 and 2 were both in the form of a grease, were less likely to generate low molecular siloxane, and had high drop resistance and a low specific gravity.

On the other hand, Comparative Example 1 was inferior to Examples 1 and 2 in the generation of low molecular siloxane, the drop resistance, and the specific gravity, since the silicone oil was used as a matrix resin. Moreover, Comparative Example 2 was inferior to Examples 1 and 2 in the drop resistance and the specific gravity, since the components B2 and B3 were not used.

INDUSTRIAL APPLICABILITY

The thermally conductive grease composition of the present invention is suitable to be interposed between a heat generating member and a heat dissipating material of electrical and electronic components or the like.

DESCRIPTION OF REFERENCE NUMERALS

1 Thermal conductivity measuring apparatus
2 Sensor
3a, 3b Sample
4 Tip of the sensor
5 Electrode for applied current
6 Electrode for resistance value (temperature measurement electrode)
11 Glass plate
12 Aluminum plate
13 Spacer
14 Thermally conductive grease
15 Compressed thermally conductive grease
16 Test piece before test
17 Test piece after test
18 Dropping distance

The invention claimed is:

1. A thermally conductive grease composition that is non-curable comprising:

A. 100 parts by mass of an ethylene-α-olefin copolymer with a kinematic viscosity of 10000 $mm^2/s$ or less at 40° C.; and B. 115 to 580 parts by mass of thermally conductive particles with respect to 100 parts by mass of the component A, wherein the thermally conductive particles contain the following:

B1. 55 to 350 parts by mass of irregularly-shaped alumina with a median particle size of 0.1 to 1 μm, in which a part or all of the alumina is surface treated with an alkoxysilane compound expressed by $R_aSi(OR')_{4-a}$, where R represents a substituted or unsubstituted organic group having 8 to 12 carbon atoms, R' represents an alkyl group having 1 to 4 carbon atoms, and a represents 0 or 1, or a partial hydrolysate of the alkoxysilane compound;

B2. 5 to 60 parts by mass of plate-shaped boron nitride with a median particle size of 0.1 to 10 μm; and B3. 55 to 170 parts by mass of aggregated boron nitride with a median particle size of 20 to 70 μm, and wherein a mass ratio of the component B3 to the component B2 is 2 to 20.

2. The thermally conductive grease composition according to claim 1, further comprising 0.1 to 2 parts by mass of an alkoxysilane compound expressed by $R_aSi(OR')_{4-a}$, where R represents a substituted or unsubstituted organic group having 8 to 12 carbon atoms, R' represents an alkyl group having 1 to 4 carbon atoms, and a represents 0 or 1, as a component C, which is a viscosity modifier.

3. The thermally conductive grease composition according to claim 1, wherein a thermal conductivity of the thermally conductive grease composition is 2.0 W/m·K or more and 8.0 W/m·K or less.

4. The thermally conductive grease composition according to claim 1, wherein a specific gravity of the ethylene-α-olefin copolymer is 0.83 to 0.85.

5. The thermally conductive grease composition according to claim 1, wherein a specific gravity of the thermally conductive grease composition is 1.0 or more and 2.4 or less.

6. The thermally conductive grease composition according to claim 1, wherein an absolute viscosity of the thermally conductive grease composition is 1000 to 20000 Pas, which is measured with a B-type viscometer.

7. The thermally conductive grease composition according to claim 1, wherein dropping of the thermally conductive grease composition is 5 mm or less, which is determined by a thermal shock test in which 0.4 g of the thermally conductive grease composition is sandwiched between two plates and compressed to a thickness of 0.5 mm, the two plates are held upright and placed in a thermal shock tester, where the compressed thermally conductive grease composition is subjected to 100 cycles of thermal shock at −40° C. for 30 minutes and 125° C. for 30 minutes.

8. The thermally conductive grease composition according to claim 1, wherein the ethylene-α-olefin copolymer is an ethylene-propylene copolymer.

9. The thermally conductive grease composition according to claim 1, wherein the thermally conductive grease composition is present in a dispenser, a bottle, a can, or a tube.

\* \* \* \* \*